United States Patent Office 3,003,983
Patented Oct. 10, 1961

3,003,983
POLYAMIDES AND POLYURETHANES DISSOLVED IN A MIXTURE OF WATER AND PHYTIC ACID AND PROCESS OF MAKING SAME
Paul R. Cox, Jr., Decatur, Ala., assignor to The Chemstrand Corporation, Decatur, Ala., a corporation of Delaware
No Drawing. Filed Sept. 25, 1958, Ser. No. 763,212
20 Claims. (Cl. 260—29.2)

This invention relates to new compositions of matter. More particularly, the invention relates to new compositions of matter comprising polymers and solvents therefor.

The field of polymer chemistry has resulted in the development of a large number of polymeric compositions capable of many end uses. Among such polymers are the polyamides and the polyurethanes. These polymers have found wide-spead utility in various industries, such as the plastics, textile, paint, and rubber industries and the like. Their end uses cover a vast field of product development. For example, in the textile and related industries, such polymer compositions are utilized in the formation of fibers, filaments, threads, films, ribbons, rods, bristles, tapes, tubes, foams, shaped articles and the like. Naturally, these polymers differ widely in their chemical and physical properties and consequently, many of them have been found more suitable for use in one or more particular fields than in others. In any event, despite their vast differences in properties, many of these polymers have one thing in common and that is the difficulty of finding suitable solvents in which they may be dissolved, thereby facilitating their processing into useful products without loss or alteration of their desirable physical and chemical properties. In the manufacture of filaments and fibers, they are usually extruded through a multi-hole spinneret into filamentary form. In order to attain a desirable end product many difficulties are encountered in this filament formation. Generally, there are three types of filament-forming methods employed in the industry at the present time. These are the melt spinning, dry spinning and wet spinning methods of fiber formation.

The melt spinning method, presently widely used, comprises melting the polymer on a heated grid and passing the melt through a filter bed of small particles, such as sand and the like and then to a spinneret. However, melt spinning has ceretain disadvantages. High temperatures are necessary where this method is employed. Moreover, where a molten polymer is used, it is often difficult to introduce additives such as plasticizers or other modifying agents to the molten composition without a tendency toward discoloration and decomposition. Furthermore, many plasticizers and modifying agents tend to be less compatible at the high temperatures required for blending in a molten composition. On the other hand, either the dry spinning method or the wet spinning method obviates certain of these disadvantages inherent in the melt spinning method.

In the dry spinning method, for example, the polymer is dissolved in a volatile solvent and extruded through a spinneret into a heated atmosphere capable of volatilizing the solvent. However, even with this method of spinning, there is danger of causing discoloration or decomposition where modifying agents have been added to the polymer solution. The wet spinning technique, however, obviates all of these disadvantages. In the wet spinning method, a solution or "dope" of the polymer is extruded through a spinneret into a medium which is a non-solvent for the polymer. Subsequently, the solvent may be recovered and recycled for further use. This method of spinning may be operated at lower temperatures and is generally more economical than either melt spinning or dry spinning. Furthermore, operation at lower temperatures facilitates the introduction of plasticizers and other modifying agents to the solution without the danger of decomposition or discoloration. Moreover, solutions are easier to handle and they can be cast into films or coatings of uniform thickness with relative ease, this being more difficult to accomplish mechanically with a molten composition due to its relatively high viscosity.

This wet spinning technique is not, however, employed commercially to any great extent with polymers such as the polyamides and polyurethanes because of the lack of suitable solvents. Although solvents do exist which are capable of dissolving these polymers, they suffer serious disadvantages. For example, many of the known solvents for the polyamides tend to be highly corrosive media, and, therefore, result in a product having undesirable properties. Furthermore, when strong acids like formic acid are used to dissolve the polyamides, degradation of the polymer occurs, especially at high temperatures or concentrations, thereby resulting in an inferior end product. There has been a serious need, therefore, in the industries where polymers such as the polyamides and polyurethanes are employed for stable solutions of these polymers which are conveniently prepared with standard equipment in suitable concentrations.

Accordingly, it is a primary object of the present invention to provide new and useful compositions of matter comprising a polymer selected from the group consisting of polyamides and polyurethanes. It is another object of the invention to provide new and useful compositions of matter comprising a solution of a polymer selected from the group consisting of polyamides and polyurethanes which can be formed into shaped articles such as threads, filaments, fibers, ribbons, rods, bristles, tapes, tubes, films and the like. It is still another object of the invention to provide a process for preparing solutions of polyamides and polyurethanes. Other objects and advantages of the instant invention will be apparent from the description thereof hereinafter.

In general, the objects of the present invention are accomplished by dissolving a polyamide or polyurethane in aqueous phytic acid or aqueous solutions of the water-soluble alkali metal acid salts, alkaline earth metal acid salts or the mixed alkali and alkaline earth metal acid salts thereof.

In addition to the phytic acid itself, the water-soluble acid salts of the alkali metals, alkaline earth metals, and the mixed acid salts of the alkali metals and alkaline earth metals of phytic acid which are useful as solvents in this invention include lithium acid phytate, potassium acid phytate, sodium acid phytate, strontium acid phytate, calcium acid phytate, magnesium acid phytate, lithium calcium acid phytate, sodium magnesium acid phytate, sodium potassium acid phytate, lithium strontium acid phytate, lithium potassium acid phytate, lithium sodium acid phytate, lithium magnesium acid phytate, potassium strontium acide phytate, potassium calcium acid phytate, potassium magnesium acid phytate, sodium strontium acid phytate, sodium calcium acid phytate, calcium strontium acid phytate, magnesium strontium acid phytate, calcium magnesium acid phytate, and the like.

When employing the aqueous solutions of the above-mentioned compounds, the water is generally present in a range of 5 percent to 50 percent based on the total weight of the solvent. However, less than 5 percent or more than 50 percent water may be employed with consequent loss of solvent power and in such cases the water and phytic acid mixture is an excellent plasticizer for the polymeric compositions previously mentioned hereinabove. It is preferred, however, that the water be employed in a range of 30 to 50 percent, based on the total weight of the solvent.

The polyamides which are useful in the practice of the instant invention are those as described in U.S. Patents 2,071,250; 2,071,253 and 2,130,948. These polyamides are synthetic linear polycarbonamides which contain recurring carbonamide groups as an integral part of the main polymer chain separated by at least two carbon atoms. They are of two types, those obtainable from polymerizable monoamino monocarboxylic acids and their amide-forming derivatives, for example, caprolactam, and those obtainable from the reaction of suitable diamines and suitable dicarboxylic acids or amide-forming derivatives of dibasic dicarboxylic acids. In these polyamides, the amide group forms an integral part of the main chain of atoms of the polymer. When hydrolized with strong mineral acids, the polyamides revert to monomeric polyamide-forming reactants. While each of these polymers varies somewhat in its solubility characteristics and the temperature of solvation, the invention is applicable to all synthetic linear polyamides of the type described. The simple unsubstituted polyamides are particularly useful in the practice of this invention. Among such polyamides are those formed by the reaction of tetramethylenediamine with adipic acid, tetramethylenediamine with suberic acid, tetramethylenediamine with sebacic acid, hexamethylenediamine with sebacic acid, the polymerization products of epsilon caprolactam, etc. In addition, polymers formed from the reaction of two or more diamines with dicarboxylic acids and/or two or more dicarboxylic acids with diamines are contemplated in the practice of the instant invention. The high molecular weight polymers or polyamides, that is, those having an intrinsic viscosity of 0.3 or above, are most useful in the formation of filaments and fibers which can be cold drawn. However, solutions of the lower molecular weight polyamides are likewise useful, for example, in lacquers, coating compositions, and the like.

The polyurethanes which may be dissolved by the solvents of this invention are those polymers formed by the reaction of isocyanates or diisocyanates with alcohols or glycols by the well-known classical esterification or condensation reactions. These polyurethanes contain the structural grouping

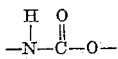

which is capable of undergoing hydrogen bonding, thus affording a considerable degree of interchain attraction. Among these polyurethanes are those formed from 1,4-butanediol and hexamethylenediisocyanate, toluenediisocyanate and methylhexanediol, dodecamethylenediisocyanate and dodecamethyleneglycol and ethylene diamine and butane-diol-bis-chloroformate. These polymers are suitable for the formation of lacquers, filaments, films, fibers, bristles and the like, depending upon the molecular weight distribution attained during polymerization. Where the polyurethane is to be employed in the fiber-forming field, normally those having an intrinsic viscosity of about 0.3 or above are the most useful. The lower molecular weight polyurethanes are, of course, most suitable in the coating and lacquer fields and the like.

When employing any of the polymeric compositions mentioned above, they may be dissolved in the phytic acid solvent in varying concentrations. The concentration of the polymer in the solvent depends upon the nature of the polymer, the solvent employed and the temperature, which in turn affect the viscosity of the solution. Normally, when the solution is to be employed in the manufacture of fibers and filaments as much as 50 percent by weight of the polymer, based on the total weight of the solution, may be dissolved in the phytic acid solvent. While it is preferred to employ 15 to 30 percent, based on the total weight of solution, of the polymer in the solvent when the solution is to be used for the preparation of fibers and filaments, it is to be understood that as little as 5 percent or less and more than 50 percent of polymer may be used when the solution is to be employed for other purposes, such as a coating or a lacquer and the like, or when lower and higher molecular weight polymers are to be dissolved. The amount of any specific polymer, which can be dissolved in the solvents in this invention, will be readily evident to those skilled in the art.

The solvents of this invention readily dissolve the polymers mentioned above within a wide range of temperature depending upon the nature of the polymer, the concentration thereof in the solvent and the nature of the solvent itself. Although temperatures within the range of 25° C. to 140° C. are preferred in bringing about dissolution, temperatures as low as 20° C. and as high as the boiling point of the polymer/solvent mixture may be employed where necessary to bring about dissolution. Heating of the solvent/polymer mixture is preferably accomplished on a water or oil bath. However, other means may be employed. If desired, agitation or stirring of the mixture may be employed during heating, although it is to be understood that it is not always necessary or critical.

If it is desired to produce shaped articles from the polymer compositions of the present invention which have a modified appearance and modified properties, various agents to accomplish these effects may be added to the polymer solutions prior to fabrication of the articles without having any ill effects thereon. Such added agents may be plasticizers, pigments, dyes, anti-static agents, fire-retarding agents, etc.

The following examples are intended to illustrate the new compositions of this invention more fully, but are not intended to limit the scope of the invention, for it is possible to affect many modifications therein. In the examples, all parts and percents are by weight unless otherwise indicated.

*Example I*

4.9 parts of phytic acid and 2.1 parts of water were mixed with 3.0 parts of polycaprolactam, having a specific viscosity of 0.72 (0.5 percent solution in 90 percent formic acid at 25° C.) and an intrinsic viscosity of approximately 1.5. This mixture was heated at 115° C. for 2½ hours with occasional stirring. The solution formed was clear, viscous and stable at 25° C. Fibers drawn therefrom were washed in 10 percent aqueous potassium hydroxide solution. These fibers were cold drawable and had good tensile strength.

*Example II*

3.3 parts of phytic acid and 1.4 parts water were mixed with .25 part of polycaprolactam, specific viscosity 0.72 (0.5 percent solution in 90 percent formic acid at 25° C.) and an intrinsic viscosity of approximately 1.5. This mixture was maintained at 25° C. for 3 hours with frequent stirring. The resulting solution was clear, viscous and stable at 25° C. The solution was stable for forming fibers and casting films.

*Example III*

6.3 parts of phytic acid and 2.7 parts of water were mixed with 1 part of polyurethane having an intrinsic viscosity of approximately 0.72 formed from reacting ethylene diamine and butane-diol-bis-chloroformate. This mixture was heated at 130° C. for 1 hour, at which time it formed a clear, viscous solution which was stable at 25° C. and suitable for forming fibers and films.

*Example IV*

2.4 parts of phytic acid and 2.4 parts of water and 0.25 part of polyhexamethyleneadipamide, specific viscosity of 0.52 (0.5 percent solution in 90 percent formic acid at 25° C.) and intrinsic viscosity of about 1.1, were mixed in a test tube and heated over an oil bath at 105° C. for 45 minutes. The solution was stable to 25° C. The solution formed was clear and viscous and was spun into a 30 percent sodium hydroxide bath.

*Example V*

4.5 parts of calcium acid phytate and 4.5 parts of water, 0.5 part of polycaprolactam, specific viscosity 0.72 (0.5 percent solution in 90 percent formic acid at 25° C.), intrinsic viscosity about 1.5, and 0.5 part of polyhexamethyleneadipamide, specific viscosity of 0.52 (0.5 percent solution in 90 percent formic acid at 25° C.), intrinsic viscosity of about 1.1, were blended together in a test tube and heated at 140° C. on an oil bath for 3½ hours with occasional stirring. A clear, viscous solution was formed. This solution was stable to temperatures of 25° C. Cold drawable fibers and films were prepared therefrom.

*Example VI*

26.2 parts of phytic acid and 11.3 parts of water were mixed with 12.5 parts of polyhexamethyleneadipamide, specific viscosity 0.52 (0.5 percent solution in 90 percent formic acid at 25° C.) and an intrinsic viscosity of about 1.1. The mixture was heated on an oil bath for 2 hours at 75° C. with occasional stirring until a solution formed. The clear, viscous solution resulting from the mixture was spun into fibers and cast into films.

The new compositions of this invention present many advantages. For example, solutions of polyamides and polyurethanes may be easily prepared on existing equipment without detailed and elaborate procedures. The phytic acid solvents of this invention are inexpensive and readily available. Furthermore, the phytic acid solvents are entirely harmless since they are neither toxic nor explosive and, therefore, may be employed without extraordinary precaution. Polymeric solutions made with the new solvents of this invention are clear and colorless and products or shaped articles prepared from such solutions exhibit superior color characteristics. Furthermore, the solvents of this invention have no effect upon the desirable chemical and physical characteristics of the polymers dissolved therein. The new phytic acid solvents also permit ready preparation of solutions containing a mixed solute, that is, for example, a polymeric solution containing as solute both a polyamide and a polyurethane. This particular property, therefore, permits preparation of a large variety of end products prepared from such solutions.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

I claim:

1. A new composition of matter comprising a polymer selected from the group consisting of synthetic linear polymeric carbonamides which have recurring carbonamide groups as an integral part of the main polymer chain separated by at least two carbon atoms, and polyurethanes containing recurring structural groups of the formula:

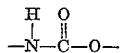

dissolved in a solvent containing 5 to 50 percent by weight of water, based on the total weight of the solvent, and 95 to 50 percent of a compound selected from the group consisting of phytic acid, the water-soluble alkali metal acid salts of phytic acid, alkaline earth metal acid salts of phytic acid, and mixed alkali and alkaline earth metal acid salts of phytic acid.

2. A new composition of matter as defined in claim 1 wherein the polymer is polyhexamethyleneadipamide.

3. A new composition of matter as defined in claim 1 wherein the polymer is polyhexamethylenesebacamide.

4. A new composition of matter as defined in claim 1 wherein the polymer is polytetramethyleneadipamide.

5. A new composition of matter as defined in claim 1 wherein the polymer is polycaprolactam.

6. A new composition of matter as defined in claim 1 wherein the polymer is the polyurethane formed from ethylenediamine and butane-diol-bis-chloroformate.

7. A new composition of matter as defined in claim 1 wherein the compound is phytic acid.

8. A new composition of matter as defined in claim 1 wherein the compound is calcium acid phytate.

9. A new composition of matter as defined in claim 1 wherein the compound is sodium acid phytate.

10. A new composition of matter as defined in claim 1 wherein the compound is magnesium acid phytate.

11. A new composition of matter as defined in claim 1 wherein the compound is potassium acid phytate.

12. A new composition of matter comprising 5 to 50 percent, based on the total weight of the composition, of a polymer selected from the group consisting of synthetic linear polymeric carbonamides which have recurring carbonamide groups as an integral part of the main polymer chain separated by at least two carbon atoms, and polyurethanes containing recurring structural groups of the formula:

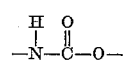

dissolved in a solvent containing 5 to 50 percent by weight of water, based on the total weight of the solvent, and 95 to 50 percent of a compound selected from the group consisting of phytic acid, the water-soluble alkali metal acid salts of phytic acid, alkaline earth metal acid salts of phytic acid, and mixed alkali and alkaline earth metal acid salts of phytic acid.

13. A new fiber-forming composition of matter comprising 15 to 30 percent, based on the total weight of the composition, of a polymer selected from the group consisting of synthetic linear polymeric carbonamides having an intrinsic viscosity of at least 0.3, which have recurring carbonamide groups as an integral part of the main polymer chain separated by at least two carbon atoms, and polyurethanes having an intrinsic viscosity of at least 0.3, which contain recurring structural groups of the formula:

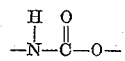

dissolved in a solvent containing 5 to 50 percent by weight of water, based on the total weight of the solvent, and 95 to 50 percent of a compound selected from the group consisting of phytic acid, the water-soluble alkali metal acid salts of phytic acid, alkaline earth metal acid salts of phytic acid, and mixed alkali and alkaline earth metal acid salts of phytic acid.

14. A process for preparing a new composition of matter comprising mixing a polymer selected from the group consisting of synthetic linear polymeric carbonamides which have recurring carbonamide groups as an integral part of the main polymer chain separated by at least two carbon atoms, and polyurethanes containing recurring structural groups of the formula:

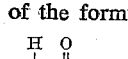

dissolved in a solvent containing 5 to 50 percent by weight of water, based on the total weight of the solvent, and 95 to 50 percent of a compound selected from the group consisting of phytic acid, the water-soluble alkali metal acid salts of phytic acid, alkaline earth metal acid salts of phytic acid, and mixed alkali and alkaline earth metal acid salts of phytic acid, and heating the mixture to a temperature in the range of 20° C. to the boiling point of the mixture to form a homogeneous solution.

15. The process as defined in claim 14 wherein the polymer is polyhexamethyleneadipamide.

16. The process as defined in claim 14 wherein the polymer is polyhexamethylenesebacamide.

17. The process as defined in claim 14 wherein the polymer is polycaprolactam.

18. The process as defined in claim 14 wherein the compound is phytic acid.

19. The process as defined in claim 14 wherein the compound is calcium acid phytate.

20. A process for preparing a new fiber-forming composition of matter comprising mixing 5 percent, based on the total weight of the composition, of polyhexamethyleneadipamide, having an intrinsic viscosity of 1.1, and a solvent containing 50 percent of phytic acid and 50 percent of water, based on the total weight of the solvent, and heating the mixture to a temperature of 105° C. to form a homogeneous solution.

References Cited in the file of this patent

UNITED STATES PATENTS

| | | |
|---|---|---|
| 2,544,637 | Caldwell | Mar. 13, 1951 |
| 2,806,830 | DeWitt | Sept. 17, 1957 |